United States Patent
Masuyama et al.

(10) Patent No.: US 7,380,001 B2
(45) Date of Patent: May 27, 2008

(54) FAULT CONTAINMENT AND ERROR HANDLING IN A PARTITIONED SYSTEM WITH SHARED RESOURCES

(75) Inventors: Kazunori Masuyama, Kanazawa (JP); Yasushi Umezawa, Cupertino, CA (US); Jeremy J. Farrell, Campbell, CA (US); Sudheer Miryala, San Jose, CA (US); Takeshi Shimizu, Sunnyvale, CA (US); Hitoshi Oi, Boca Raton, FL (US); Patrick N. Conway, Los Altos, CA (US)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 10/150,618

(22) Filed: May 17, 2002

(65) Prior Publication Data

US 2002/0186711 A1   Dec. 12, 2002

Related U.S. Application Data

(63) Continuation-in-part of application No. 09/861,293, filed on May 17, 2001.

(60) Provisional application No. 60/301,969, filed on Jun. 29, 2001.

(51) Int. Cl.
*G06F 15/173* (2006.01)
*G06F 15/00* (2006.01)
*G06F 11/00* (2006.01)

(52) U.S. Cl. .................... 709/226; 712/13; 714/10; 714/25

(58) Field of Classification Search .............. 714/51, 714/8, 10, 25; 709/226; 705/8; 712/13
See application file for complete search history.

(56) References Cited

U.S. PATENT DOCUMENTS

| 5,175,839 A | 12/1992 | Ikeda et al. |
| 5,465,338 A | 11/1995 | Clay |
| 5,561,780 A | 10/1996 | Glew et al. |

(Continued)

FOREIGN PATENT DOCUMENTS

JP       10-228458       8/1998

(Continued)

OTHER PUBLICATIONS

Abandah, Gheith A. and Davidson, Edward S., "Effects of Architectural and Technological Advances on the HP/Convex Exemplar's Memory and Communication Performance," IEEE 1998—1063-6897, pp. 318-329.

(Continued)

*Primary Examiner*—Jason Cardone
*Assistant Examiner*—Tanim Hossain
(74) *Attorney, Agent, or Firm*—Fenwick & West LLP (57) ABSTRACT

A system and method for fault containment and error handling within a domain in a partitioned computer system includes a system manager having read and write access to a resource definition table. The system manager is adapted to quiesce the system when failure occurs within a domain, identify an allocated resource associated with the failed domain, identify a non-failed domain, and exit the quiesce mode for the non-failed domain, thereby containing a failure within the failed domain. The system manager further handles an error within the failed domain by deallocating a resource allocated to the failed domain so that the resource becomes available to non-failed domains.

12 Claims, 6 Drawing Sheets

U.S. PATENT DOCUMENTS

| | | | |
|---|---|---|---|
| 5,592,671 A | | 1/1997 | Hirayama |
| 5,727,150 A | | 3/1998 | Laudon et al. |
| 5,761,460 A | | 6/1998 | Santos et al. |
| 5,829,032 A | | 10/1998 | Komuro et al. |
| 5,859,985 A | | 1/1999 | Gormley et al. |
| 5,887,134 A | | 3/1999 | Ebrahim |
| 5,931,938 A | | 8/1999 | Drogichen et al. |
| 5,987,506 A | * | 11/1999 | Carter et al. ................. 709/213 |
| 6,006,255 A | | 12/1999 | Hoover et al. |
| 6,014,669 A | | 1/2000 | Slaughter et al. |
| 6,014,690 A | | 1/2000 | VanDoren et al. |
| 6,026,472 A | | 2/2000 | James et al. |
| 6,092,213 A | | 7/2000 | Lennie et al. |
| 6,163,855 A | | 12/2000 | Shrivastava et al. |
| 6,651,182 B1 | | 11/2003 | Chang et al. |
| 6,678,840 B1 | * | 1/2004 | Kessler et al. ................. 714/51 |
| 6,725,261 B1 | | 4/2004 | Novaes et al. |
| 6,973,517 B1 | * | 12/2005 | Golden et al. .............. 710/104 |
| 2002/0078263 A1 | | 6/2002 | Darling et al. |
| 2002/0184345 A1 | | 12/2002 | Masuyama et al. |
| 2002/0186711 A1 | | 12/2002 | Masuyama et al. |
| 2003/0005070 A1 | | 1/2003 | Narasimhamurthy et al. |
| 2003/0005156 A1 | | 1/2003 | Miryala et al. |
| 2003/0007457 A1 | | 1/2003 | Farrell et al. |
| 2003/0007493 A1 | | 1/2003 | Oi et al. |
| 2003/0023666 A1 | | 1/2003 | Conway et al. |
| 2004/0199680 A1 | | 10/2004 | Shah |

FOREIGN PATENT DOCUMENTS

| JP | 2000-132530 | 5/2000 |
|---|---|---|
| JP | 2002-132697 | 5/2002 |

OTHER PUBLICATIONS

Falsafi, Babak and Wood, David A., "Reactive NUMA: A Design for Unifying S-COMA and CC-NUMA," ISCA '97, CO, USA, pp. 229-240.

Geralds, John, "Sun Enhances Partitioning in Starfiew Unix Server" [online], 1999 VNU Business Publishing Limited [retrieved on Apr. 11, 2001]. Retrieved from the Internet: <URL: http://www.vnunet.com/print/104311>.

IBM NUMA-Q Enterprise Server Architecture "Solving Issues of Latency and Scalability in Multiprocessor Systems," Jan. 19, 2000, IBM, 10 pages.

Lovett, Tom and Clapp, Russell, "St iNG: A CC-NUMA Computer System for the Commercial Marketplace," ISCA '95, PA, USA, pp. 308-317.

Servers White Paper "Sun Enterprise™ 10000 Server: Dynamic System Domains" [online], Apr. 11, 2001, Sun Microsystems, Inc., Palo Alto, CA, USA. 2001. [retrieved on Apr. 11, 2001]. Retrieved from the internet: <URL: http://www.sun.com/servers/white-papers/domains.html?pagestyle=print>.

Unisys White Paper "Cellular Multiprocessing Shared Memory: Shared Memory and Windows," Sep. 2000, pp. 1-16.

Willard, Christopher, "Superdome—Hewlett-Packard Extends Its High-End Computing Capabilities," 2000, IDC White Paper, pp. 1-20.

* cited by examiner

|   | Valid bit<br>10 | Domain ID<br>20 | Resource Entry<br>30 |
|---|---|---|---|
| 7 | 1 | 2 | Resource 7 |
| 6 | 0 | 0 | Resource 6 |
| 5 | 0 | 0 | Resource 5 |
| 4 | 0 | 2 | Resource 4 |
| 3 | 0 | 0 | Resource 3 |
| 2 | 1 | 3 | Resource 2 |
| 1 | 1 | 0 | Resource 1 |
| 0 | 1 | 0 | Resource 0 |

| | Valid bit<br>10 | Domain ID<br>20 | Resource Entry<br>30 |
|---|---|---|---|
| 7 | 1 | 2 | Resource 7 |
| 6 | 0 | 0 | Resource 6 |
| 5 | 0 | 0 | Resource 5 |
| 4 | 0 | 2 | Resource 4 |
| 3 | 0 | 1 | Resource 3 |
| 2 | 1 | 3 | Resource 2 |
| 1 | 1 | 0 | Resource 1 |
| 0 | 1 | 0 | Resource 0 |

Lowest numbered unallocated resource → 3

|   | Valid bit<br>10 | Domain ID<br>20 | Resource Entry<br>30 |
|---|---|---|---|
| 7 | 1 | 2 | Resource 7 |
| 6 | 0 | 0 | Resource 6 |
| 5 | 0 | 0 | Resource 5 |
| 4 | 0 | 2 | Resource 4 |
| 3 | 1 | 1 | Resource 3 |
| 2 | 1 | 3 | Resource 2 |
| 1 | 1 | 0 | Resource 1 |
| 0 | 1 | 0 | Resource 0 |

FAULT CONTAINMENT AND ERROR HANDLING IN A PARTITIONED SYSTEM WITH SHARED RESOURCES

RELATED APPLICATION

This application is a continuation-in-part and claims priority from U.S. patent application Ser. No. 09/861,293 entitled "System and Method for Partitioning a Computer System into Domains" by Kazunori Masuyama, Patrick N. Conway, Hitoshi Oi, Jeremy Farrell, Sudheer Miryala, Yukio Nishimura, Prabhunanadan B. Narasimhamurthy, filed May 17, 2001.

This application also claims priority under 35 U.S.C. § 119(e) to U.S. Provisional Application No. 60/301,969, filed Jun. 29, 2001, and entitled "Fault Containment and Error Handling in a Partitioned System with Shared Resources" by Kazunori Masuyama, Yasushi Umezawa, Jeremy J. Farrell, Sudheer Miryala, Takeshi Shimizu, Hitoshi Oi, and Patrick N. Conway, which is incorporated by reference herein in its entirety.

FIELD OF THE INVENTION

The present invention relates generally to partitioning of a computer system into domains, and more particularly to fault containment and error handling in a partitioned computer system with shared resources.

BACKGROUND OF THE INVENTION

Multi-node computer systems are often partitioned into domains, with each domain functioning as an independent machine with its own address space. Partitioning allows resources of a computer system to be efficiently allocated to different tasks. Domains in partitioned computer systems may dynamically share resources. When a fatal failure of a packet processing occurs in a domain, the processing cannot be continued in the system. As a result, a shared resource entry is left in an intermediate state. To reset and restart operation of the failing domain in the system, the shared resource must be reset entirely. This requires resetting all other domains, even if the other domains are running with no failure in the system.

One solution for error containment and recovery in a partitioned system is to use a dedicated resource for each domain so that if a failure occurs within a domain non-failing domains are not affected. However, using a dedicated resource for each domain to enable an error containment and recovery in a partitioned system requires a larger amount of resources than using a shared resource, because the amount of the resource has to accommodate the maximum requirements of all the domains in the system.

Therefore, it is desirable to provide a mechanism that would allow the system to contain an error in a failed domain so that non-failed domains remain unaffected.

SUMMARY OF THE INVENTION

The present invention is a system and method for fault containment and error handling in a logically partitioned computer system having a plurality of computer nodes coupled by an interconnect.

A system includes at least one resource that is dynamically shared by some or all domains. A resource definition table stores information related to a status of each resource, for example, whether a resource is allocated to a domain. The resource definition table also maintains an association between a resource and a domain to which the resource is allocated.

The system further includes a system manager having both read and write access to the resource definition table. When a packet processing failure occurs in a domain, the system manager forces the system to temporarily postpone the initiation of new packets by putting the system into a quiesce mode. The system manager observes the status information of the shared resources. For example, it identifies an allocated resource that is left in an intermediate state. Using a domain identifier stored in the resource definition table, the system manager also detects a failed domain associated with the allocated resource. System manager also detects one or more non-failed domains as having no resource associated with them in the resource definition table. The system manager then exits a quiesce mode for the non-failed domain so that non-failed domains resume their operations, thereby containing an error in the failed domain. The system manager then handles an error in the failed domain. For example, it deallocates the allocated resource for future use by other domains and resets the failed domain. As a result, the fault is contained within the failed domain, and non-failed domains continue their operations without being reset.

BRIEF DESCRIPTION OF THE DRAWINGS

FIG. 2B is a block diagram illustrating a process of deallocation of a resource in the resource definition table of FIG. 2a.

FIG. 2C is a block diagram illustrating a process of selection of a lowest numbered resource for allocation in the resource definition table of FIG. 2a.

DETAILED DESCRIPTION OF THE INVENTION

Figure 1:
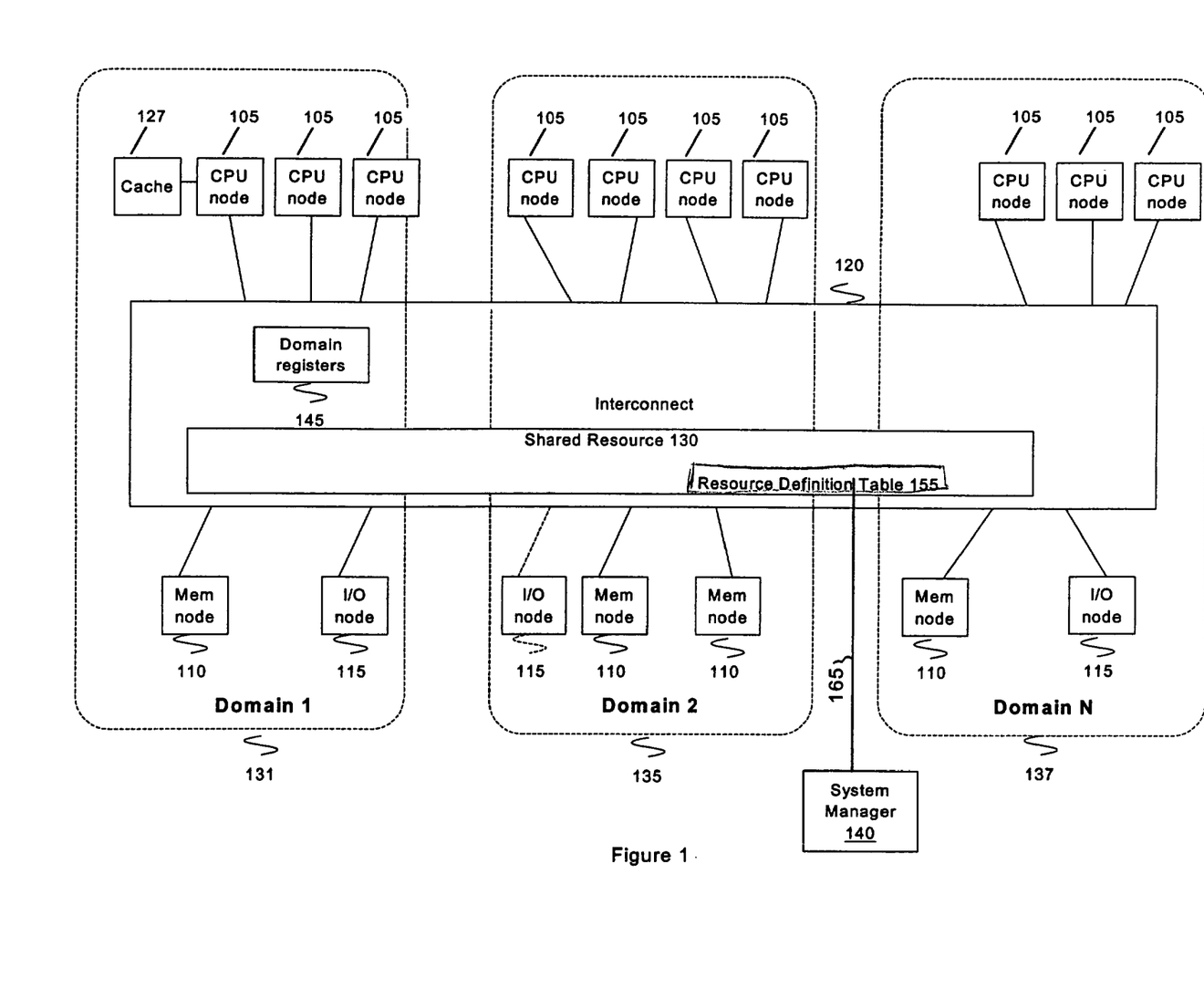
FIG. 1 is a block diagram of an overall architecture of a multi-node computer system in accordance with the present invention.

Referring now to FIG. 1, there is shown a block diagram of a multi-node computer system 100 that is partitioned into a plurality of domains. Each domain 131, 135, and 137 shown in FIG. 1 includes a plurality of nodes: central processing unit (CPU) nodes 105, memory nodes 110, and input/output (I/O) nodes 115 coupled via an Interconnect 120. CPU node 105 is a conventional processing unit, for example, an Intel or Intel-compatible Pentium™ class or higher processor, a Sun SPARC™ class or higher processor, or an IBM/Motorola PowerPC™ class or higher processor. I/O node 115 is a conventional I/O system, for example, a storage device, an input device, a peripheral device, or the like. Memory node 110 is a conventional memory system, for example, a dynamic random access memory system, a static random access memory system, or the like. Each node may be implemented on a separate computer chip, computer board, or stand-alone unit. CPU nodes 105, memory nodes 110, and I/O nodes 115 communicate with each other using packets through Interconnect 120. Interconnect 120 may be, for example, a conventional global interconnect, or include a router. Each domain 131, 135, and 137 has its own local domain registers for controlling the state of each local domain. An example domain register 145 is shown in FIG. 1. Each local domain register preferably includes a variety of different types of local registers, such as control registers, status registers, and error logging registers (not shown).

System 100 further includes a pool of one or more shared resources 130 dynamically used by at least one domain in system 100. System 100 further includes a resource definition table 155 for storing a status of a resource and an association between a resource and a domain to which that resource is allocated, even when the resource is no longer allocated to that domain. Resource definition table 155 is implemented as a register array with address decoding logic to allow entries to be read or written. The resource definition table 155 may also be implemented as a static RAM array with separate read and write ports. Resource definition table 155 is described in more details below in connection with FIGS. 2A-2D.

System 100 further includes an external agent called a system manager 140 coupled to interconnect 120. In a preferred embodiment, system manager 140 has read and write access to resource definition table 155. This advantageously allows system manager 140 to identify an allocated resource left in an intermediate state. Using domain ID, system manager 140 identifies a failed domain associated with the allocated resource. System manager 140 maintains a list of all domains in system 100 and a list of failed domains. This allows system manager 140 to identify a non-failed domain as having no resources associated with it in the resource definition table 155.

System manager 140 has both read and write access privileges to one or more local domain registers, for example, domain register 145. Having these privileges permits system manager 140 to monitor and control the state of each individual domain, such as to quiesce domains 131, 135, and 137 as part of a reconfiguration process. If a hardware fault occurs within a domain, the domain can become deadlocked because interconnect 120 is deadlocked. In conventional computer systems, deadlocked domains have the capability to cause errors in the operation of other domains due to resource sharing across domains. Having write and read access to local domain registers, such as register 145, allows system manager 140 to reset the domain state of a deadlocked domain. System manager 140 operates independently of the hardware or software running on any individual domain and thus is not affected by hardware or software faults in any individual domain of the computer system 100. System manager 140 may be implemented as hardware, software, firmware and combinations thereof. System manager 140 may be part of a system controller (not shown) having a control interface (not shown) for a system administrator (not shown).

Figure 2A:
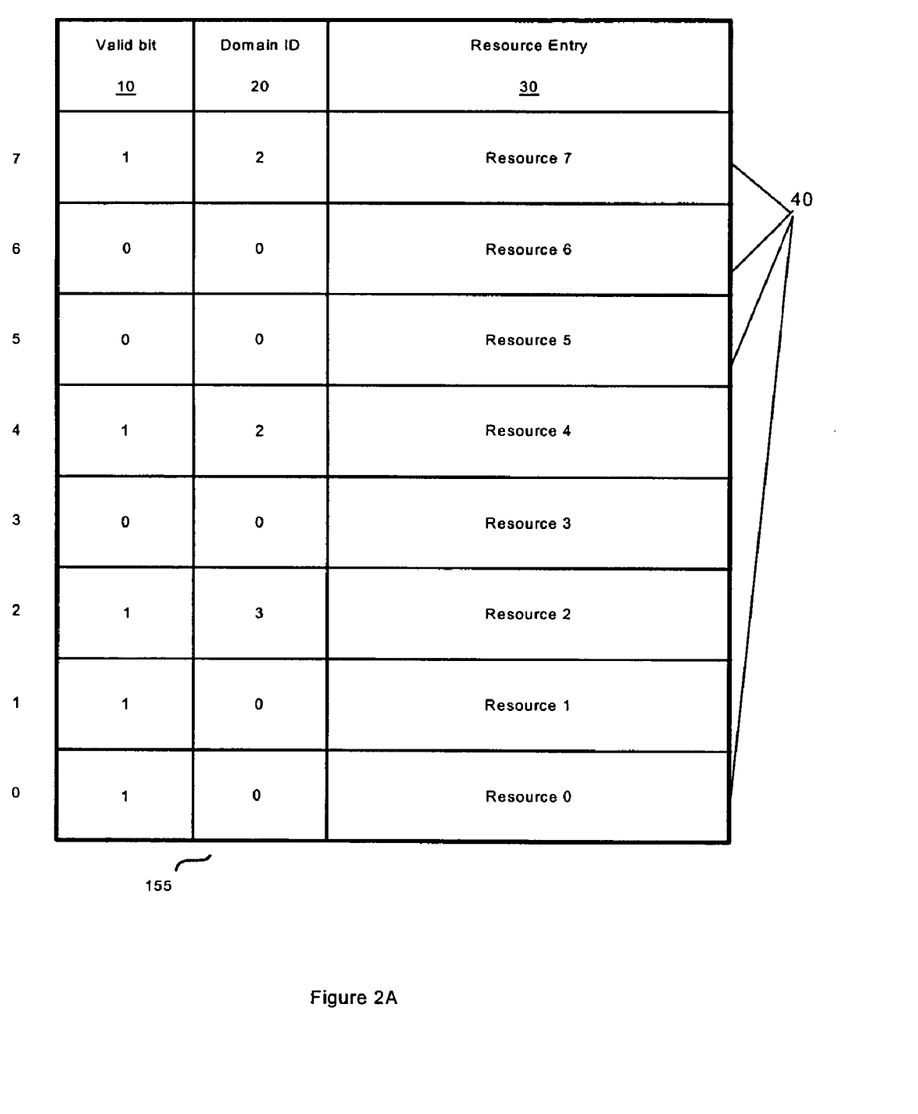
FIG. 2A is a block diagram of a resource definition table in accordance with the embodiment of FIG. 1.

Referring now to FIG. 2A, there is shown resource definition table 155 for keeping track of the state of outstanding transactions in system 100. Resource definition table 155 shown in FIG. 2A includes eight entries. It should be noted that resource definition table 155 may include any number of entries. Each shared resource entry 40 is allocated to a domain when a packet is sent from a node to interconnect 120. The state information of the shared resource entry 40 is updated when further processing is performed. The shared resource entry 40 is deallocated once the sequence of packet processing is completed. Resource definition table 155 preferably has the following fields: valid bit 10; domain ID 20; and resource entry 30. Valid bit field 10, which has a specified value, indicates whether a resource is allocated to a domain. In one embodiment of the present invention, valid bit field 10 is "1" when a resource is allocated and valid bit field 10 is "0" when the resource is deallocated. Domain ID field 20 identifies the domain to which the resource is allocated. Having domain ID 20 advantageously allows system 100 to maintain the association between a resource and its corresponding domain so that when a failure occurs in system 100, system manager 140 can identify one or more non-failed domains. As illustrated in FIG. 2A, Resources 0 and 1 are allocated by domain 0; Resource 2 is allocated by domain 3; Resources 4 and 7 are allocated by domain 2.

Figure 2B:
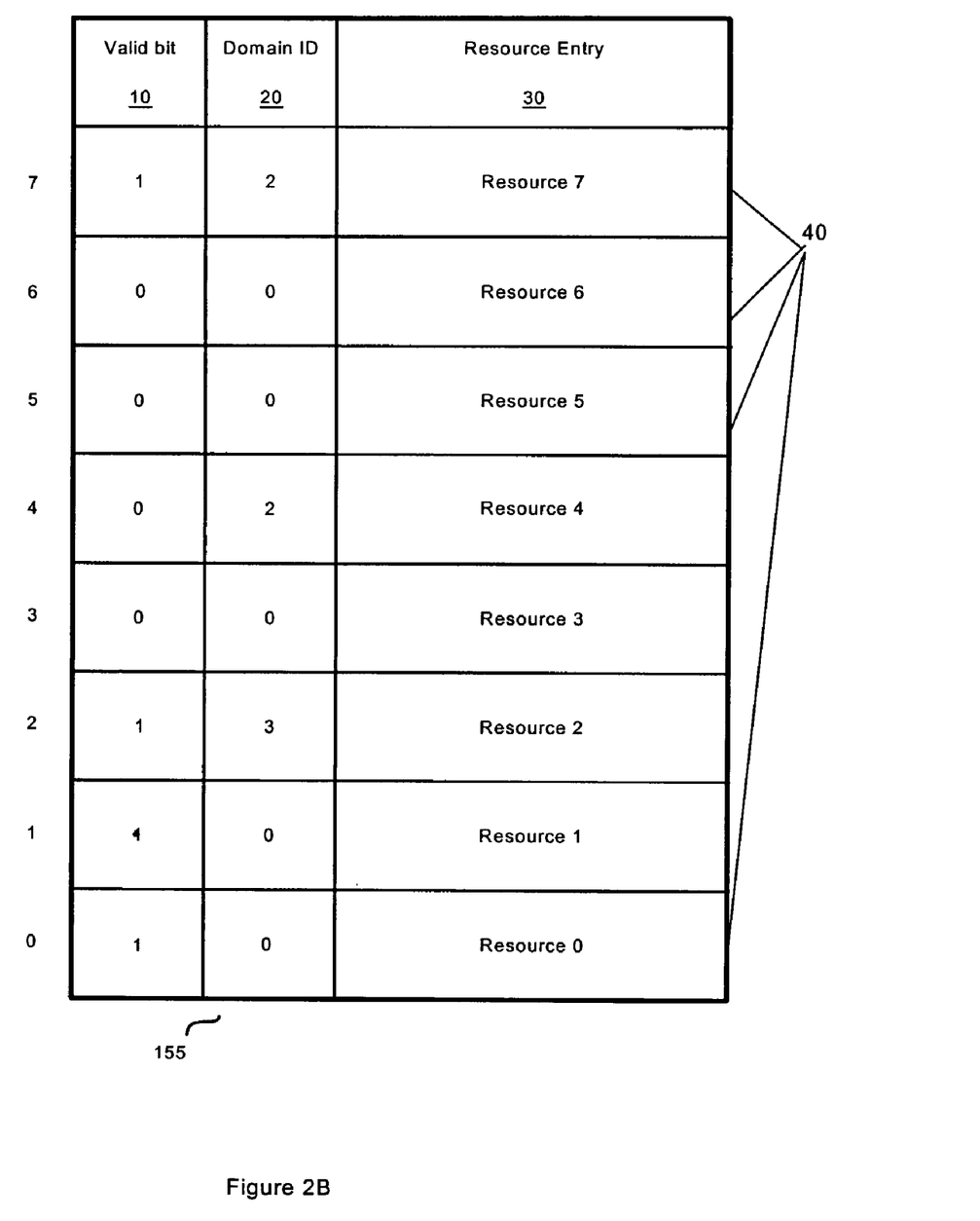

FIG. 2B illustrates a process of deallocation of a resource in resource definition table 155. For example, resource 4 is deallocated once the sequence of packet processing is completed. Valid bit field 10 for resource 4 is then cleared from 1 to 0. It should be noted that domain ID field 20 retains the value it had when resource 4 was allocated to domain 2. This information is useful for identifying what domain last used resource 4.

Figure 2C:
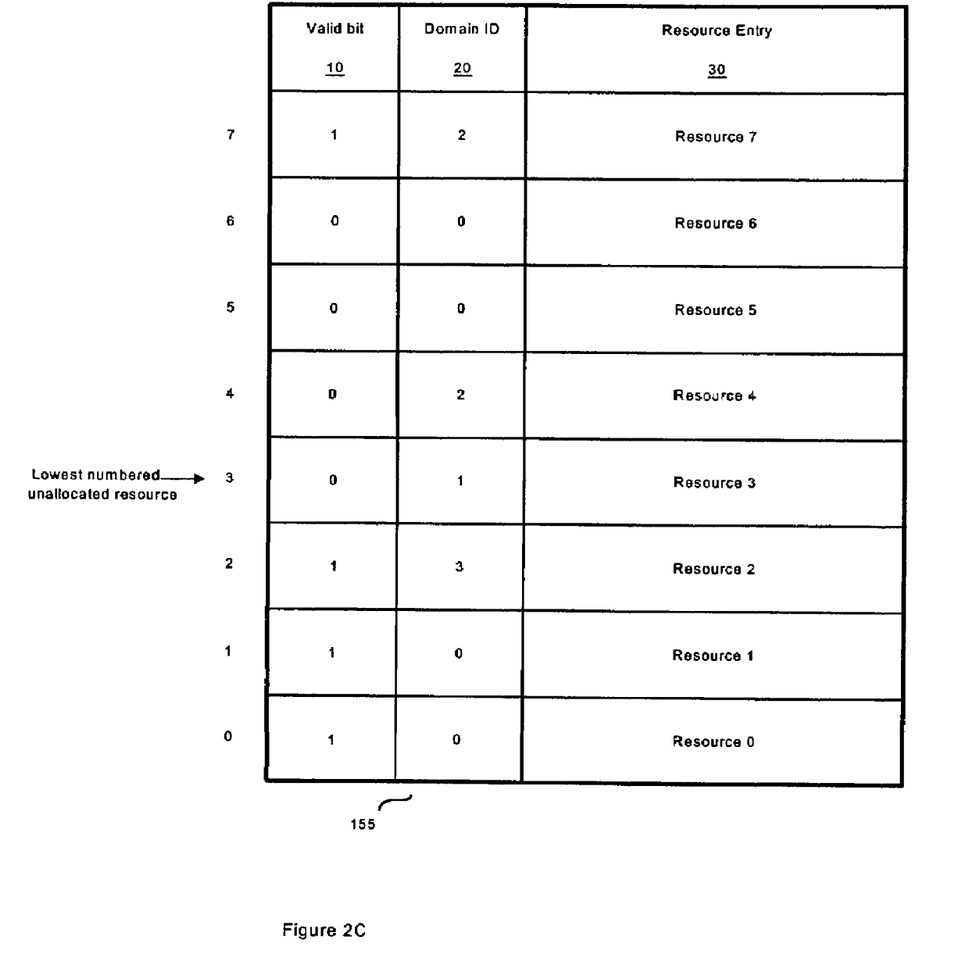

FIG. 2C illustrates a process of selection of a resource for allocation. To select a resource for allocation, a priority encoder (not shown) decodes the valid bits 10 of all resources in resource definition table 155 and selects a lowest numbered unused resource. As illustrated in FIG. 2C, resource 3 is a lowest numbered unallocated resource. Resource 3 is allocated when a packet is sent from a node, such as CPU node 105, to interconnect 120 to hold the state of the processing of the packet. The state information of the shared resource is updated when further processing is performed.

Figure 2D:
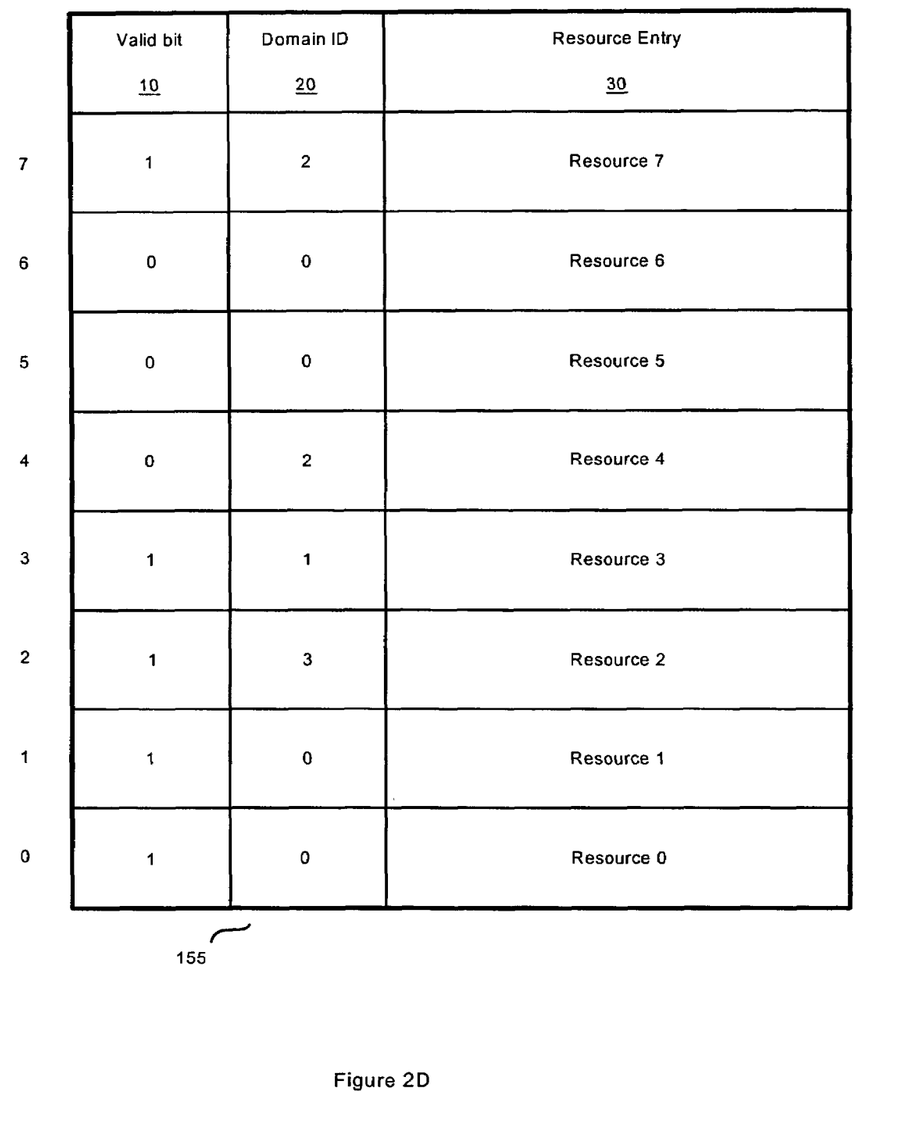
FIG. 2D is a block diagram illustrating the resource definition table following the allocation of resource 3 by domain 1.

FIG. 2D illustrates resource definition table 155 following the allocation of resource 3 by domain 1. Once a domain has allocated a resource, only that domain or system manager 140 has permission to modify or deallocate that resource. In the shown example, either domain 1 or system manager 140 has permission to modify or deallocate resource 3. This allows system 100 to maintain resource isolation. Resource isolation is implemented by checking the domain ID of all messages which access resource definition table 155. If a message originated from a domain that is different from the domain ID in the domain ID field 20 of a resource it tries to modify, then it indicates an error condition which must be logged and reported to system manager 140.

Figure 3:
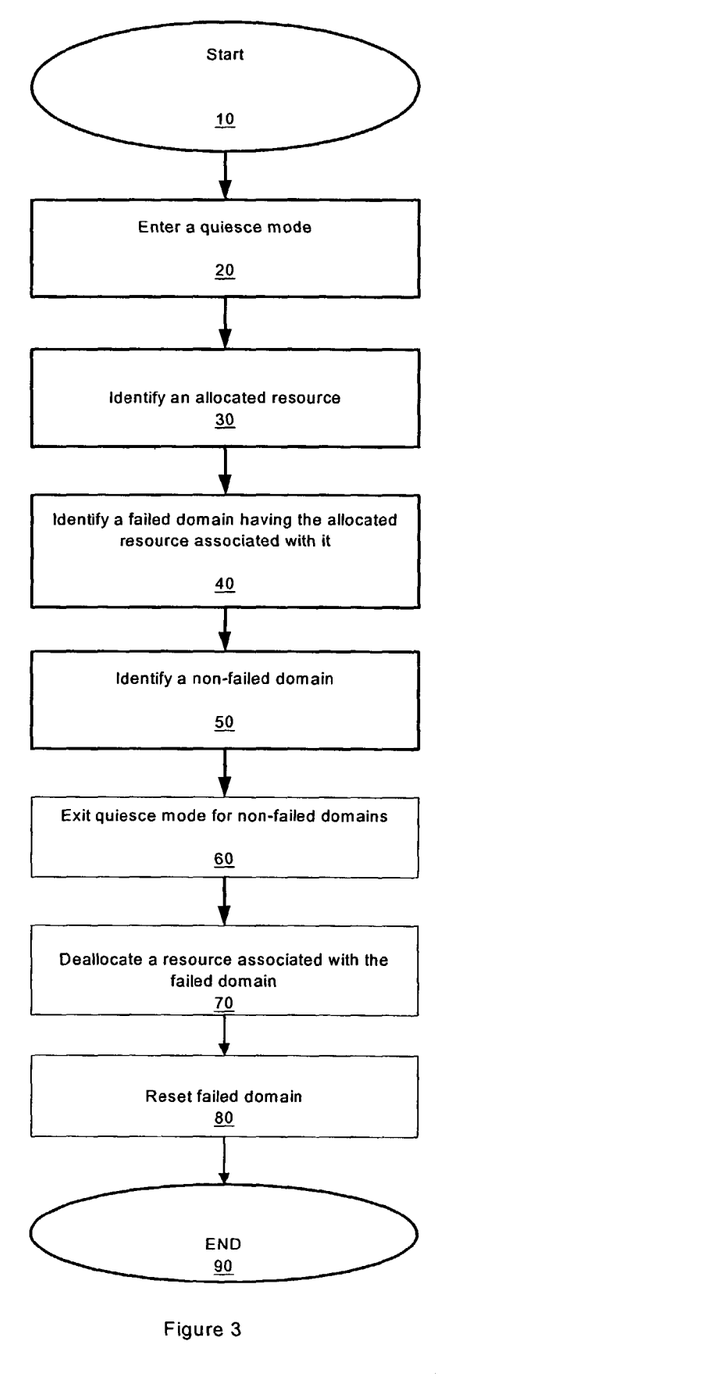
FIG. 3 is a flow chart of a method performed by the embodiment of FIG. 1A.

FIG. 3 is a flow chart of a method of error containment and recovery in a logically partitioned system with shared resources. The process starts 10 when a packet processing failure occurs within a domain and the domain becomes deadlocked. System manager 140 quiesces 20 all the nodes in all domains in system 100 so that no new transactions are accepted and all outstanding transactions in all domains are run to completion.

System manager 140 puts system 100 in a "quiesce" mode, preferably using a mechanism called "bus lock," which is issued when a node, such as CPU node 105, needs to lock down all the resources in a partitioned system. System manager 140 broadcasts a lock acquisition request to each node in all domains. Each node in system 100 receiving the request ceases issuing new processor requests to system 100. Each node guarantees sufficient resources for any outstanding requests from system 100 to that node to complete the outstanding request and waits for responses to be received for all outstanding requests. Subsequently, a response generated to the lock acquisition request is sent to system manager 140 by each node. Once responses have been received from all nodes, system 100 has been drained of all outstanding requests and enters the "quiesce" mode.

If a request is not completed due to a packet processing error, then no response to the lock acquisition request will be received from a particular node. This situation is detected by simply having system manager 140 timeout. Once the timeout interval expires, system manager 140 examines 30 resource definition table 155 to identify an allocated resource left in an intermediate state. Using domain ID, system manager detects 40 a failed domain associated with the allocated resource. It also detects 50 one or more non-failed domains as having no allocated resource associated with them in resource definition table 155. For example, as shown in FIG. 2A, domain 0 is a non-failed domain having no resources associated with it. Once system manager 140 identifies a non-failed domain, it exits 60 a quiesce mode for that domain. For example, system manager 140 issues lock release requests to all the nodes in all domains so that they can continue issuing new requests to interconnect 120. This allows system manager 140 to contain a failure within a failed domain so that non-failed domains do not have to be rebooted.

System manager 140 then handles an error in the failed domain. For example, it deallocates 70 the resource associated with the failed domain so that other non-failed domains can make use of that resource. Thus, if in FIG. 2b, domain 2 is a failed domain having resource 4 allocated to it, system manager 140 deallocates resource 4 and makes it available to non-failed domains by clearing valid bit field 10 in resource definition table 155 so that valid bit field 10 changes its value from "1" to "0". It should be noted that domain ID field 20 retains the value it had when resource 4 was allocated. System manager 140 uses this information to identify that domain "2" used resource 4 last.

In the preferred embodiment of the present invention, channel 165 beneficially allows system manager 140 to selectively reset 80 a hardware state in a deadlocked domain by reinitializing or rebooting the system. Once the failed domain is reset, the process ends 90. As a result, the fault is contained within the failed domain, non-failed domains continue their operations without being reset, and the failed domain is reset.

What is claimed is:

1. A partitioned computer system for containing and handling a packet processing failure in a failed domain, comprising:
    a resource definition table for storing a status of at least one allocated resource dynamically shared by at least one domain, each resource associated with a domain ID identifying the domain to which the resource is allocated; and
    a system manager having write and read access to the resource definition table, the system manager:
        entering a quiesce mode for each node in each domain, in response to the packet processing failure in the system,
        identifying an allocated resource in a resource definition table,
        identifying the failed domain associated with the allocated resource in the resource definition table,
        identifying at least one non-failed domain as having no allocated resource associated with it in the resource definition table,
        exiting the quiesce mode for the non-failed domain,
        deallocating the allocated resource associated with the failed domain in the resource definition table; and
        selectively resetting a hardware state in a deadlocked domain by reinitializing the system.

2. The system of claim 1, wherein the system manager further deallocates the allocated resource associated with the failed domain by changing a status of the resource indicated in the resource definition table.

3. The system of claim 1, wherein each resource in the resource definition table is associated with a valid bit having a specified value indicating whether the resource is allocated.

4. The system of claim 3, wherein the specified value indicates that the resource is allocated in response to the valid bit being zero.

5. The system of claim 3, wherein the specified value indicates that the resource is allocated in response to the valid bit being one.

6. The system of claim 1, wherein the system manager is implemented as hardware.

7. The system of claim 1, wherein the system manager is executable as computer code embodied within a computer-readable storage medium.

8. In a computer system partitioned into at least two domains, each domain having a plurality of computer nodes, a method for containing and handling a packet processing failure in a failed domain, comprising:
    entering a quiesce mode for each node in each domain, in response to the packet processing failure in the system;
    identifying an allocated resource in a resource definition table;
    identifying the failed domain associated with the allocated resource in the resource definition table;
    identifying at least one non-failed domain as having no allocated resource associated with it in the resource definition table;
    exiting the quiesce mode for the non-failed domain;
    deallocating the allocated resource associated with the failed domain in the resource definition table; and
    selectively resetting a hardware state in a deadlocked domain by reinitializing the system.

9. The method of claim 8, further comprising a step of resetting the failed domain.

10. The method of claim 8, wherein the step of resetting the failed domain further comprises changing a state of the failed domain.

11. The method of claim 8, wherein the step of entering the quiesce mode further comprises issuing a lock acquisition request to each node in each domain.

12. The method of claim 8, wherein the step of exiting the quiesce mode further comprises issuing a lock release request to each node in each domain.

* * * * *